United States Patent [19] [11] 4,137,693
Thompson et al. [45] Feb. 6, 1979

[54] RAKE DEVICE FOR REMOVING WEEDS FROM LAKES

[76] Inventors: Lowell H. Thompson, 519 Belmont Rd., Grand Forks, N. Dak. 58201; Arne Goplen, Binford, N. Dak. 58416

[21] Appl. No.: 796,428

[22] Filed: May 12, 1977

[51] Int. Cl.² ............................................ A01D 44/00
[52] U.S. Cl. ........................................ 56/8; 56/16.7; 37/54
[58] Field of Search ................... 37/54, 55, 119, 120, 37/71, 137, 103; 56/8, 9, 16.7, 400.2; 172/305, 273, 26.5, 26.6, 42, 101, 102

[56] References Cited
U.S. PATENT DOCUMENTS

| | | | |
|---|---|---|---|
| 626,491 | 6/1899 | Ford | 37/67 |
| 2,334,323 | 11/1943 | Gilbert | 172/26.5 X |
| 2,343,033 | 2/1944 | Swanson | 56/400.2 |
| 2,812,596 | 11/1957 | Schofield | 172/26.5 |
| 3,406,761 | 10/1968 | Ryan | 172/42 |
| 3,417,554 | 12/1968 | Sudhoff | 56/16.7 |
| 3,814,190 | 6/1974 | Wilson | 172/26.5 |
| 3,992,791 | 11/1976 | Dean | 172/26.5 X |

*Primary Examiner*—Clifford D. Crowder
*Attorney, Agent, or Firm*—Robert E. Kleve

[57] ABSTRACT

A portable frame adapted to be mounted on a beach adjacent a lake. The portable frame has a reversible motor and a pair of drive wheels driven by the motor. A rake is provided with an elongated handle. The drive wheels of the frame are adapted to engage the handle of the rake to move the rake backward and forward powered by the motor. The rake has teeth which fold inward when the rake is moved forward into the lake along the lake floor powered by the motor and the teeth will remain upright when the rake is powered back out of the lake, so that the teeth will engage the weeds and will take or pull the weeds out of the bottom of the lake as the rake is powered back out of the lake.

2 Claims, 8 Drawing Figures

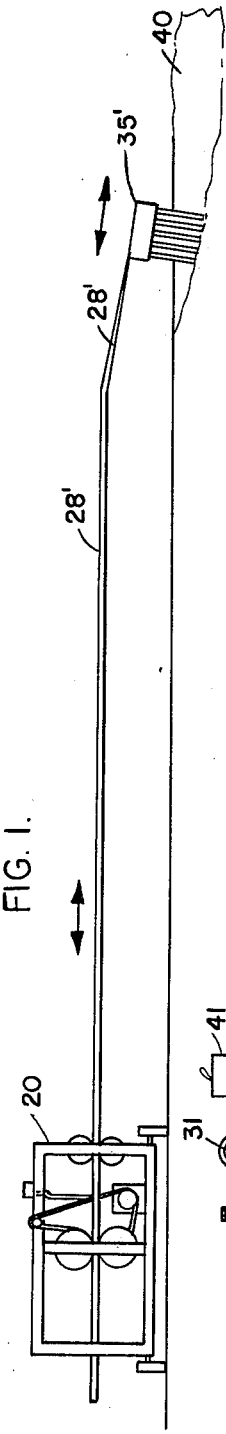
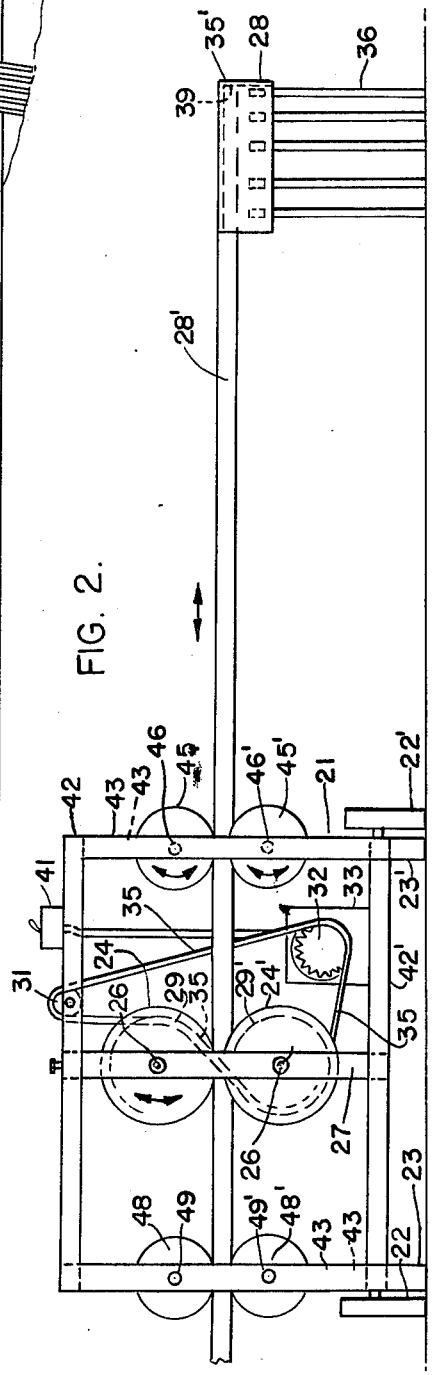
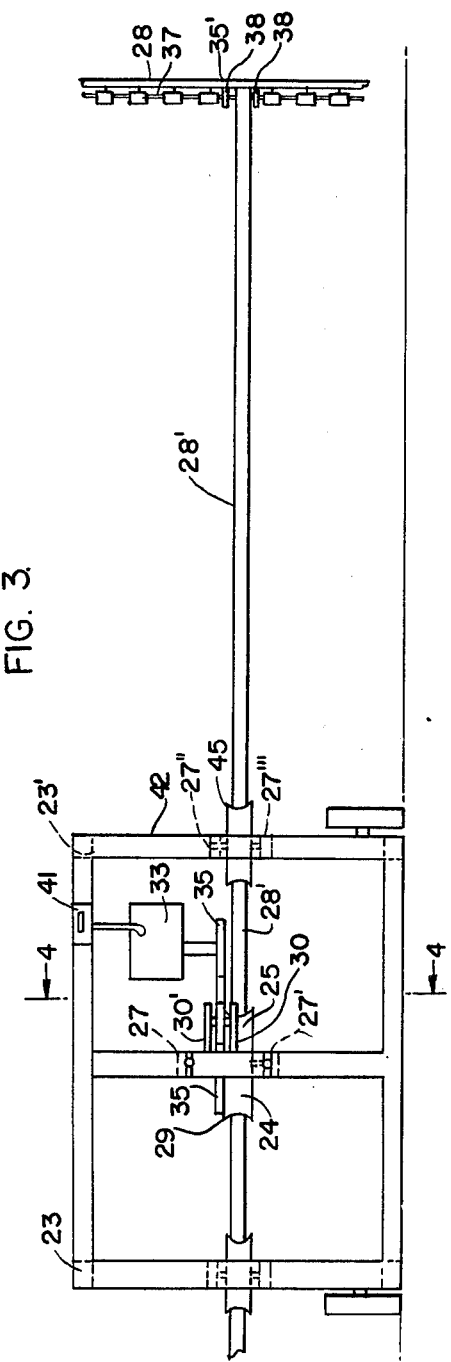

FIG. 4.
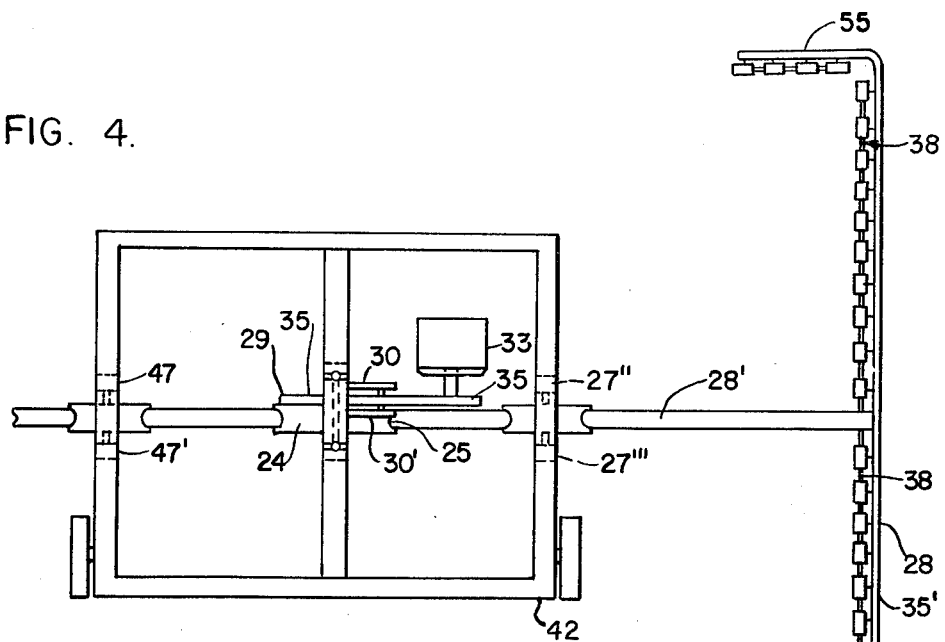
FIG. 5.
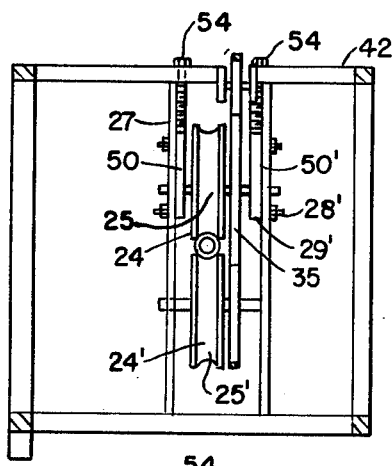
FIG. 6.
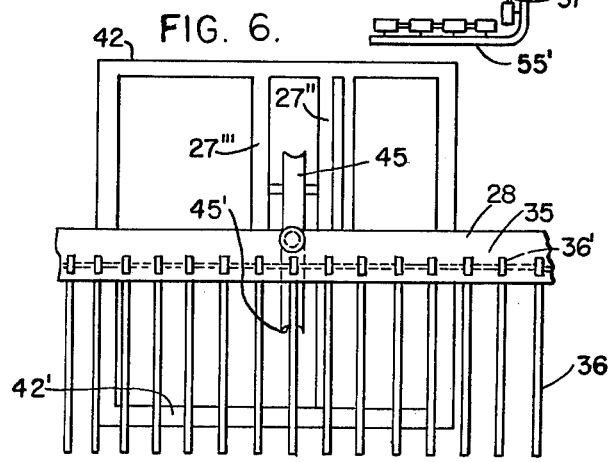
FIG. 7.
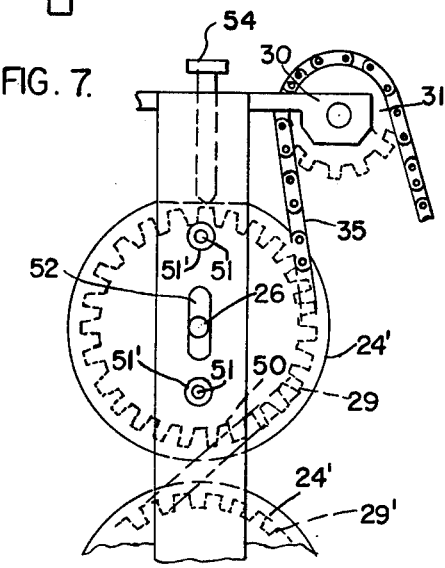
FIG. 8.

RAKE DEVICE FOR REMOVING WEEDS FROM LAKES

The invention relates to devices for removing weeds from the lake bottoms or the lake floors.

It is an object of the invention to provide a novel device which is mounted on the land adjacent the edge of a lake having a rake with an eleongated pole, and a reversible motor on the device to move the pole longitudinally to move the rake out into the lake along the lake bottom with means to reverse the motor to drive the pole back toward the land or shore and pull the rake toward the shore with the rake engaging weeds and other matter along the bottom of the lake to rake the lake bottom to remove the weeds as the rake moves toward the shore.

It is another object of the invention to provide a novel machine having means to move a rake out from the shore along the lake bottom with the teeth of the rake pivoting out of the way to travel over the weeds along the lake bottom while the rake is moving out into the lake, and with the teeth pivoting to a relatively fixed downward position when the rake is moved back toward shore so that the teeth will rake the lake bottom as the rake moves toward shore.

It is another object of the invention to provide a novel shore mounted device for removing weeds and vegetable matter from the bottom of a lake.

Further objects and advantages of the invention will become apparent as the description proceeds and when taken in conjunction with the accompanying drawings wherein:

FIG. 1 is a side elevational view of the shore mounted raking device raking the lake bottom by moving the rake in and out of the lake along the lake floor or bottom.

FIG. 2 is an enlarged side elevational view of the raking device.

FIG. 3 is a top view of the raking device.

FIG. 4 is a top view of the raking device illustrating the rake.

FIG. 5 is a cross-sectional view taken along line 5—5 of FIG. 2.

FIG. 6 is a front elevational view of the device with fragmental showing of the rake.

FIG. 7 is an enlarged fragmental side view of the drive.

FIG. 8 is an enlarged fragmentary front view of the drive.

Briefly stated, the invention comprises a portable frame having a reversible motor, a rake having an elongated handle, a pair of drive wheels to engage the handle of the rake to move the rake backward and forward powered by the motor, said rake having teeth which fold inward when the rake is moved forward into the lake along the lake floor powered by a motor and which will remain upright when the rake is powered back out of the lake so that the teeth will engage the weeds and will rake or pull the weeds out of the bottom of the lake as the rake is powered back out of the lake.

Referring more particularly to the drawings in FIG. 1, the raking device 20 is illustrated as having a rectangular frame 21 with a pair of wheels 22 and 22' mounted at one end and a pair of fixed legs 23 and 23' at the other end, a pair of wheels 24 and 24' having concave inner surfaces 25 and 25' which are rotatably mounted on the shafts 26 and 26' which shafts are mounted to a pair of upright supports 27 and 27' which supports are mounted centrally on the frame.

The concave inner surfaces 25 and 25' of the wheels engage the opposite surfaces of the handle 28' of the rake 28.

A pair of gears 29 and 29' are fixed axially to the back of the wheels 24 and 24' and the gears 29 and 29' are slightly smaller than the wheels 24 and 24'. A pair of flanges 30 and 30' are fixed to the top of the frame 21 and a gear 31 is rotatably mounted between the flanges 30 and 30'. A gear 32 is rotatably mounted to the output shaft of a reversible motor 33. The motor 33 is fixed to a floor of the frame 21. An endless link chain 35 travels over the gear 32 around the front end of the gear 29' and the back edge of gear 29 and over the gear 31 and back to gear 32, so that the motor drives the gears 29 and 29', with gear 29 driving in an opposite direction to gear 29' to thereby drive the wheels 24 and 24' fixed to the gear in opposite directions.

The wheels 24 and 24' engage opposite surfaces of the handle 28' and by driving in opposite directions, drive the handle in one direction to move the rake forward into the lake along the lake bottom, and reversing the motor drive the wheels 24 and 24' in the opposite direction and thereby move the handle rearwardly between the wheels out of the lake.

The rake 28 has a lateral plate 35' fixed across the front of the handle 28' and the plate 35' has lateral rearwardly extending end portions 55 and 55'. A plurality of teeth 36 have eyelets 36' at their upper ends and are rotatably mounted on a shaft 37. The shaft 37 is fixed to the lateral plate 35' and lateral plate portions 55 and 55' by a plurality of brackets or supports 38 which are fixed to the shaft 37 at one end and are fixed to the lateral plates 35', 55, and 55' at the other end.

The teeth 36 are made of flexible steel and can pivot clockwise when the rake moves from left to right when viewed from FIG. 1 to fold up. The teeth 36 cannot pivot counterclockwise past the upright portion shown in FIG. 1 when the rake moves from right to left when viewed from FIG. 1, as the teeth engage the inner surfaces 39 of the lateral plate 35 and consequently remain relatively rigid and upright when the rake moves from right to left. The teeth may be fixedly attached at their pivot points and the teeth will then flex backward as the rake is moved forward and remain at least partially upright as the rake moves reaward.

The teeth 36 mounted on the side plate 35' and 35" can flex rearwardly.

OPERATION

The raking device operates as follows:

The raking device 20 will be placed on the beach or shore adjacent the lake 40. The handle 28' of the rake will be inserted between wheels 24 and 24'. The handle 28' will be made in sections or lengths so that the length of the handle may be approximately 40 or 50 feet in length. For purposes of illustration the left end of the handle 28' is cut off as the handle would extend normally 30 or 40 feet further to the left than is illustrated.

The reversible electric motor is controlled by a reversible switch 41 and the motor will be connected to a source of electric power.

The rake 28 will be positioned into the lake 40, as illustrated, and the handle which is made of steel pipe will have sufficient flexibility so that the rake will bow downward under its own weight so that the teeth will engage the lake floor or bottom.

The motor 31 will be energized by the switch 41 so that the motor drives the wheels 24 and 24' in a direction to drive the handle 28' from left to right which powers or pushes the rake 28 from left to right moving the rake out along the lake floor out into the lake. As the rake moves outward from left to right into the lake, the handle 28' will flex downward enough so that the teeth will move or slide along the lake floor. The teeth 36 will fold upward as the rake moves from left to right so that the teeth will not normally catch onto the weeds.

When the rake has been moved out into the lake a selected distance of 30 to 40 feet, the motor will be reversed by reversing the motor switch and the motor will now drive or power the handle 28' from right to left which moves the rake along the lake floor or bottom from right to left out of the lake. When the rake moves from right to left the teeth will pivot upright as they engage weeds and other growth along the lake floor and will catch the weeds and other growth and draw the weeds with the rake out of the lake.

When the rake has been brought back to shore, the weeds and other growth caught by the rake will be removed from the rake and the operation will be repeated.

If all the weeds along that path have not been removed, sufficiently, the operation will be repeated. Once all the weeds have been sufficiently removed along the path of the rake, the device will be moved on the wheels parallel to the edge of the lake a distance equal to the length of the rake to place the rake at a new position so that the rake can remove another strip of weeds from the lake. The rake is moved each time the length of the rake after each rake operation until the entire lake bottom has been removed of weeds the desired width, to a distance for approximately 30 or 40 feet into the lake. Additional lengths of handle may be provided if it is desired to extend the rake further into the lake.

The frame 21 has a rectangular upper or top frame 42 and a rectangular lower frame 42' with four corner posts 43 fixing the frames together. A pair of horizontal center rods 44 and 44' are fixed across the upper and lower frames, respectively.

The frame 21 has a pair of upright supports 27 and 27' fixed between the horizontal center rods 44 and 44'. The motor will be mounted to the lower frame 42' by a floor fixed across the lower frame.

The frame 21 has a second pair of uprights 27" and 27'" fixed between the rectangular upper frame and rectangular lower frame at the front of the frame. A pair of guide pulleys 45 and 45' are rotatably mounted between the uprights 27" and 27'" on shafts 46 and 46'.

The frame 21 has a third pair of uprights 47 and 47' fixed between the rectangular upper frame and rectangular lower frame at the rear of the frame 21. A pair of guide pulleys 48 and 48' are rotatably mounted between the uprights 47 and 47' on shafts 49 and 49'.

The handle 28' is adapted to roll between guide pulleys 45 and 45' and 48 and 48' with the pulleys acting to guide the handle along a straight path as the drive wheels 24 and 24' drive the handle forward and rearward.

The teeth of the rake may be adjusted so that they pivot upward to only an angle to horizontal either rearward or to a forward angle somewhat past upright when the rake is moved rearward.

The wheels 24 and 24' will have rubber or other frictional material along the inner concave surface. The wheel 24 and its gear 29 are adjustable vertically relative to the wheel 24' by the shaft 26 being fixed to plates 50 and 50' of supports 27 and 27'. The plates 50 and 50' may be slid vertically on supports 27 and 27' and locked by nuts and bolt 51. The supports 27 and 27' have a vertically elongated slot 52 so that the shaft 26 may be slid upward and downward on the supports 27 and 27' when the plates 50 and 50' are slid upward or downward and the plates 50 and 50' have vertical slots 53 to receive the bolts 51, with the horizontal width of the slots 53 being less than the heads of the bolts 51 so that the plates 50 and 50' can slide upward and downward to be adjusted when the bolts 51 and the nuts 51' are loose and then the bolts 51 and nuts 51' may be tightened to lock the plates 50 and 50' to the supports 27 and 27' and thereby adjust and lock the wheel 24 and gear 29. A pair of elongated screws 54 are threaded downward from the top frame down against the upper edge of plates 50 and 50' to additionally lock the plates 50 and 50' in their adjusted positions.

The rubber concave inner surface of the wheels 24 and 24' will have sufficient resiliency so that the handle 28' may be inserted inbetween the wheels without having to adjust the wheels by driving the wheels 24 and 24' in a direction to cause the handle to be drawn inbetween the wheels.

Various other devices may be attached to the forward end of the handle 28', instead of the rake, such as a packer or cutter bar for packing or firming up the bottom of the lake or for cutting the weeds along the bottom out to forty or fifty feet.

It will be obvious that various changes and departures may be made to the invention without departing from the spirit and scope thereof and accordingly it is not intended that the invention be limited to that specifically described in the specification or as illustrated in the drawing but only as set forth in the appended claims wherein.

What is claimed is:

1. A device for raking the bottom of lakes comprising a portable frame adapted to be mounted on a beach adjacent a lake, said portable frame having a reversible motor and a pair of wheels at least one of which is driven by said motor, a rake having an elongated flexible rod means acting as a handle, said device being positioned with the front end of said rod means pointed toward said lake, with said rake mounted at the front end of said rod means, said rod means having a portion engagably mounted between said wheels to be driven by said at least one drive wheel to move the rod means endwise longitudinally along its length forward and backward powered by the motor to thereby move the rake forward and backward into and out of the lake, rod support guide means mounted on said device at a location along the length of the rod means and spaced from the drive wheels having portions receiving and engaging lateral sides of the rod means to guide said rod means longitudinally along its length when driven by said drive wheel, said rake having upright teeth said teeth having means whereby said teeth may move rearwardly and inwardly when said rake is moved forward into the lake along the floor bottom powered by said motor, said rake having stop means acting to retain said teeth substantially upright when said rake is powered rearward out of the lake.

2. A device for raking the bottom of lakes comprising a portable frame adapted to be mounted on a beach adjacent a lake, said portable frame having a reversible motor and a pair of drive wheels each driven by said motor, with one of said wheels directly above the other of said wheels and with said wheels rotatably mounted on axes which are parallel to one another, a rake, an elongated flexible rod means acting as a handle having its forward end mounted to said rake, said rod means having a portion engagably mounted between the drive wheels along the circumferential outer edges of the wheels to be driven by the drive wheels to move the rod means generally horizontally endwise forward and backward and thereby move the rake forward and backward, said motor powering said drive wheels, said rake having teeth, said teeth being foldable rearward and inward when the rake is moved forward into the lake along the lake bottom powered by the motor, said teeth being mounted to remain substantially upright when the rake is powered backward out of the lake, so that the teeth will engage the weeds and will pull the weeds out of the bottom of the lake as the rake is powered back out of the lake, at least a pair of roller support guide wheels mounted on said device and spaced horizontally from said drive wheels to engage about said flexible rod means to support said rod means horizontally when said rod means is moved longitudinally along its length by said drive wheels.

* * * * *